United States Patent
Kelders

(10) Patent No.: US 10,543,974 B2
(45) Date of Patent: Jan. 28, 2020

(54) PRESSURE CONTROL SYSTEM

(71) Applicant: Airopack Technology Group B.V., RK Waalwijk (NL)

(72) Inventor: Quint Kelders, RK Waalwijk (NL)

(73) Assignee: AIROPACK TECHNOLOGY GROUP B.V., Waalwijk (NL)

( * ) Notice: Subject to any disclaimer, the term of this patent is extended or adjusted under 35 U.S.C. 154(b) by 0 days.

(21) Appl. No.: 15/546,356

(22) PCT Filed: Jan. 26, 2016

(86) PCT No.: PCT/EP2016/051572
§ 371 (c)(1),
(2) Date: Jul. 26, 2017

(87) PCT Pub. No.: WO2016/120269
PCT Pub. Date: Aug. 4, 2016

(65) Prior Publication Data
US 2017/0327301 A1    Nov. 16, 2017
US 2018/0148248 A9    May 31, 2018

(30) Foreign Application Priority Data
Jan. 27, 2015   (EP) .................................... 15152767

(51) Int. Cl.
*B65D 83/38*   (2006.01)
*B65D 83/66*   (2006.01)
(Continued)

(52) U.S. Cl.
CPC .......... *B65D 83/38* (2013.01); *B29C 65/1635* (2013.01); *B29C 66/5452* (2013.01); *B65D 83/64* (2013.01); *B65D 83/663* (2013.01)

(58) Field of Classification Search
CPC ...... B65D 83/38; B65D 83/663; B65D 83/64; B29C 66/5432; B29C 66/5452; B29C 66/636; B29C 65/1635
(Continued)

(56) References Cited

U.S. PATENT DOCUMENTS 4,995,533 A  *  2/1991  Vandoninck ........... B65D 83/14
                                                    222/130
5,110,014 A  *  5/1992  Doundoulakis ...... B67D 1/0412
                                                    222/396
(Continued)

FOREIGN PATENT DOCUMENTS

WO    2005/082744 A1    9/2005

OTHER PUBLICATIONS

International Search Report for PCT Serial No. PCT/EP2016/051572 dated May 10, 2016.
(Continued)

*Primary Examiner* — Paul R Durand
*Assistant Examiner* — Robert K Nichols, II
(74) *Attorney, Agent, or Firm* — Lathrop Gage LLP

(57)  ABSTRACT

A pressure control system provided for maintaining a constant predetermined excess pressure in a fluid dispensing container comprises a high-pressure plastic vessel having an inner chamber, and a pressure control device having a valve and mounted on the open end of the high-pressure vessel, whereas a passageway is provided from the inner chamber to the outside, which is controlled by the valve. A piston with a protruding stem is provided in a guide member, whereas between the guide member and the piston a chamber with a gas with a reference pressure smaller than the high pressure is enclosed, and the high pressure vessel is closed by a closure with a central bore of smaller diameter than the diameter of the stem, and the piston end remote from the
(Continued)

protruding stem is pressurized by the fluid in the fluid dispensing container.

4 Claims, 1 Drawing Sheet

(51) Int. Cl.
    *B29C 65/16*     (2006.01)
    *B29C 65/00*     (2006.01)
    *B65D 83/64*     (2006.01)

(58) Field of Classification Search
    USPC .................. 222/394, 399, 396, 494, 386.5
    See application file for complete search history.

(56) References Cited

U.S. PATENT DOCUMENTS

| | | | | |
|---|---|---|---|---|
| 5,285,931 | A * | 2/1994 | Alfons ................. | B65D 83/663 |
| | | | | 137/903 |
| 6,851,575 | B2 * | 2/2005 | van't Hoff ............ | B65D 83/44 |
| | | | | 222/402.1 |
| 7,708,171 | B2 * | 5/2010 | Regan ................... | B65D 83/64 |
| | | | | 222/389 |
| 2006/0180615 | A1 * | 8/2006 | Vanblaere .............. | B65D 83/62 |
| | | | | 222/386.5 |

OTHER PUBLICATIONS

Written Opinion of the International Searching Authority for PCT. Serial No. PCT/EP2016/051572 dated May 10, 2016.

\* cited by examiner

PRESSURE CONTROL SYSTEM

CROSS-REFERENCE TO RELATED APPLICATIONS

This application is a National Stage application of International Patent Application No. PCT/EP2016/051572, filed on Jan. 26, 2016, which claims priority to European Patent Application No. EP15152767.8, filed on Jan. 27, 2015, each of which is hereby incorporated by reference in its entirety.

TECHNICAL FIELD

The invention pertains to a pressure control system provided for maintaining a constant predetermined excess pressure in a fluid dispensing container.

BACKGROUND OF THE INVENTION

Such a pressure control system is described in WO-A-2005/082744, wherein the high-pressure vessel is substantially cylindrical with a tapered neck portion and a flange, on which a ring-shaped insert or closure with a step-like funnel is mounted. The pressure control device of this document is provided within a ring-shaped closure by a cup-like cylinder having a closed end and an open end, in which a piston with a downward protruding stem and a broader cylindrical end portion is movable mounted. The piston is sealed by an O-ring to the inner wall of the cup-like cylinder and can be moved in a reciprocating manner. At the open end of the step-like funnel an O-ring is pinched by a ring-cylinder, whereas the broader cylindrical portion of the stem and the O-ring provide a valve which is moved in a reciprocating manner by the pressure of a pressurizing gas, i.e. air, in the chamber formed by the piston and the cup-like cylinder with its closed end.

When mounting the piston into the cup-like cylinder, it is very important that the outer wall of the O-ring will not be impaired or damaged. Already very small incisions will influence the life-span of the pressure control device, since pressurized gas or air could escape and diminish the reference pressure gradually. A similar problem occurs with the pinched O-ring, which provides a valve with the broader cylindrical portion of the stem. Although in use the piston and the stem will have a reciprocating movement of less than one mm, there will be little wear, which influences the longevity of the pressure control system.

SUMMARY OF THE INVENTION

It is an object of the present invention to provide a pressure control system with a high-pressure vessel, which is of simple construction and may be assembled and pressurized in an easy manner. Another object of the invention is to provide a pressure control device, in which wear of the parts can be neglected. These objects of the invention are accomplished by a pressure control system with the features of claim 1.

According to embodiments of the invention, the pressure control system for maintaining a constant predetermined excess pressure in a fluid dispensing container comprise a high-pressure plastic vessel having an inner chamber and a closed end and an open end, and a pressure control device having a valve and mounted on the open end of the high-pressure vessel, whereas a passageway is provided from the inner chamber to the outside, which is controlled by the valve. A piston with a protruding stem is provided in a guide member, whereas between the guide member and the piston a chamber with a gas with a reference pressure smaller than the high pressure is enclosed. The high pressure vessel is closed by a closure with a central bore of smaller diameter than the diameter of the stem, and the piston end remote from the protruding stem is pressurized by the fluid in the fluid dispensing container. Through the smaller diameter of the central bore compared to the diameter of the stern, the stem may seal the central bore. The pressure from the fluid in the fluid container pushes the stem against the central bore, so that the high pressure vessel will be closed gas-tight.

According to an embodiment of the pressure control system the piston is urged towards the closure of the high-pressure vessel by a resilient means. The resilient means is a second elastic disc, which is fixed to the outer rim of the guide member. By the resilient means the pressure from the stem against the central bore can be increased.

According to another embodiment of the pressure control system the bore of the closure is covered by a first elastic disc which is fixed between the guide member and the closure. The central bore will be closed gas-tight by the first elastic disc.

Further advantages will follow from the description below.

BRIEF DESCRIPTION OF THE FIGURES

In the following, the invention is described in greater detail, by way of example, with reference to the accompanying drawings.

DETAILED DESCRIPTION OF PREFERRED EMBODIMENTS

Figure 1:
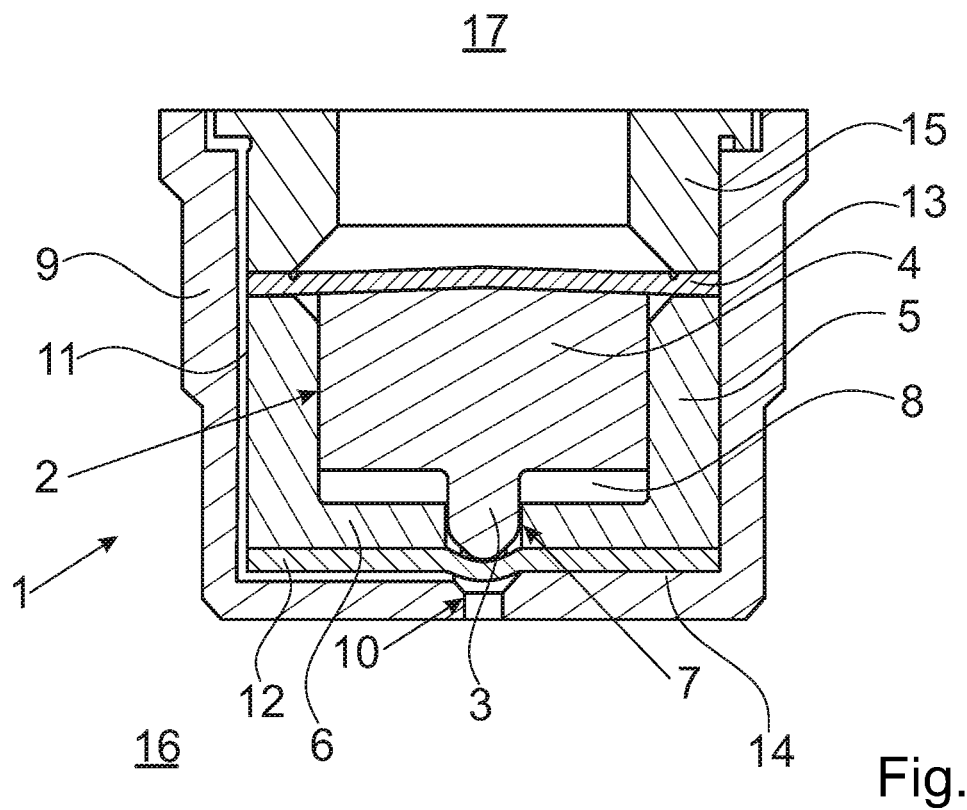
FIG. 1 shows a pressure control system with a piston and a guide member guiding the piston in an open condition of the valve.
Figure 2:
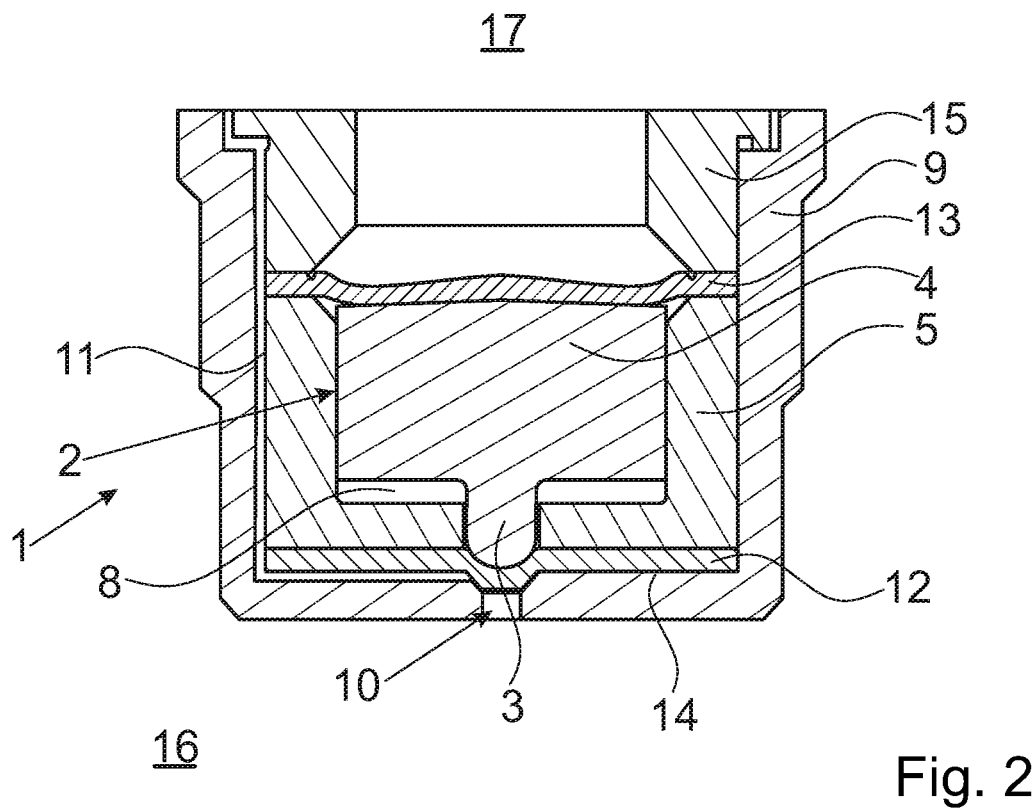
FIG. 2 shows the pressure control system of FIG. 1 wherein the valve is in a closed condition.

FIG. 1 shows a pressure control system 1 with a piston 2 having a broad cylindrical part 4 and a downwards protruding stem 3, which piston is guided in a guide member 5. The guide member 5 has the form of a circular cylinder with a circular disc 6 having a first central bore 7. The diameter of the stem 3 is slightly less than the diameter of the first central bore 7, so that the stem 3 is more or less airtight moveable in a reciprocating manner in the central bore 7. The outer wall of the broad cylindrical part 4 of the piston 2 is more or less gas-tight moveable along the inner wall of the guide member 5. Between the bottom of the piston and the opposite inner bottom wall of the guide member 5 a reference pressure chamber 8 is provided. The guide member 5 is mounted press-fit in a cup-like closure 9, which has a second central bore 10 with a diameter smaller than the diameter of the protruding stem 3, so that the second bore 10 can be closed by the stem 3. As can be seen in FIGS. 1 and 2, the end of the stem 3 is rounded and the entrance of the bore 10 is conical commensurate to the rounding of the stem 3. Between the guide member 5 and the closure 9 a channel or passageway 11 is provided, so that a pressurized gas or air can flow from bottom to the top of the closure 9. The channel 11 has only a small cross-section of less than about two mm. An elastic disc 12 is fixed between the circular disc 6 of the guide member 5 and the bottom part 14 of the closure 9. Thus, this first elastic disc or gasket 12 is clamped by the lower wall of the guide member 5 and the inner wall of the closure 9. On top of the guide member 5 a second elastic disc or gasket 13 is provided which is fixed by a ring-shaped stop member 15 which is also mounted press-fit in the closure 9.

The piston 2 is thus enclosed by the first gasket 12 and the second gasket 13 which as resilient means urge the piston 2 in a rest position. The closure 9 is mounted on a high-pressure vessel—indicated by the number 16. The ring-shaped stop member 15 opens into a fluid dispenser container—indicated by the number 17.

In FIG. 2 the pressure control system 1 is shown wherein the valve, provided by the protruding stem 3, the first gasket 12 and the second central bore 10 of the closure 9, is closed. In this closed condition the pressure in the fluid dispensing container 17 and in the reference pressure chamber 8 are essentially equal. If the pressure in the fluid dispensing container 17 drops because fluid is dispensed, through a push-button (not shown) of the container 17, the piston 2 is urged upwards and the valve is opened, so that a gas with high pressure can flow through the passageway 11 into the container 17 until the pressure in the container 17 and the pressure in the reference pressure chamber 7 plus the closing pressure of the stem 3 towards the bore 10 are equal again, under which condition the valve is closed.

The length of the stem 3 is defining the volume of the reference pressure chamber 8. If the length of the stem 3 is enlarged, the thickness of the broad cylindrical part 4 of the piston 2 is reduced accordingly.

All parts of the pressure control system 1 as described above are made of plastic. Although the piston 2 is usually solid, the cylindrical part 4 of the piston may be hollow. Further, the pressure control system 1 is normally circular cylindrical but can have also a square cylindrical form. Any other cylindrical forms can also be used.

The parts of the pressure control system 1 are mounted under atmospheric pressure, so that in the rest condition (FIG. 1) of the system the pressure in the reference chamber 8 is about 1 bar. If the valve is closed (FIG. 2), i.e. when the stem 3 with the first gasket 12 is just closing the bore 10, the pressure in the reference chamber 8 plus the closing pressure of the stem 3 should be equal to the pressure in the fluid dispensing container 17. If the stem 3 of the piston 2 is longer, the volume of the reference chamber 8 will be larger, which means that the ratio between the pressure difference and the stroke of the stem 3 will be smaller, so that a more subtle pressure control is possible.

It is further clear to the skilled person that the first and second gaskets 12 and 13 are not absolutely necessary for the functioning of the pressure control system 1 as described above. If the outer wall of the broad cylindrical part 4 of the piston is large enough, the piston will be sealed gas-tight against the inner wall of the guide member 5, so that the outer end of the stem 3 in itself will already close the bore 10 sufficiently if in the closing position. The stem 3 should then also be moveable gas-tight in the central bore 7.

While the present invention has been illustrated and described with respect to a particular embodiment thereof, it should be appreciated by those of ordinary skill in the art that various modifications to this invention may be made without departing from the spirit and scope of the present.

What is claimed is:

1. A pressure control system provided for maintaining a constant predetermined excess pressure in a fluid dispensing container, comprising a high-pressure plastic vessel having an inner chamber and a closed end and an open end, and a pressure control device having a valve and mounted on the open end of the high-pressure plastic vessel, whereas a passageway is provided from the inner chamber to an outside of the high-pressure plastic vessel, which is controlled by the valve, wherein a piston with a downward protruding stem is provided in a guide member, whereas a bottom of the guide member has a first central bore in which the downward protruding stem is moveable in a reciprocating manner, whereas between a downward bottom of the piston and an inner wall of the guide member opposite to the downward bottom of the piston, a chamber with a gas having a reference pressure smaller than a pressure of the gas in the high-pressure plastic vessel is enclosed, and the high-pressure plastic vessel is closed by a closure with a second central bore having an entrance portion and a core portion, whereas the diameter of the core portion is of smaller diameter than the diameter of the downward protruding stem, an outer end of the downward protruding stem is prevented from entering the core portion of the second central bore and the second central bore is sealable by means of the outer end of the downward protruding stem in a downward movement of the piston, and a piston end remote from the downward protruding stem is pressurized by fluid in the fluid dispensing container, such that when a pressure in the fluid dispensing container drops, the piston is urged upwards and the valve is opened, so that a gas with high pressure can flow through the passageway into the fluid dispensing container until the pressure in the fluid dispensing container and the reference pressure in the chamber with a reference gas having a reference pressure, plus a closing pressure of the downward protruding stem towards the second central bore are equal again, under which condition the valve is closed.

2. The pressure control system according to claim 1, wherein the piston is urged towards a bottom part of the closure by a resilient means.

3. The pressure control system according to claim 2, wherein the resilient means is an elastic disc which is fixed to the outer rim of the guide member.

4. A pressure control system provided for maintaining a constant predetermined excess pressure in a fluid dispensing container, comprising a high-pressure plastic vessel having an inner chamber and a closed end and an open end, and a pressure control device having a valve and mounted on the open end of the high-pressure plastic vessel, whereas a passageway is provided from the inner chamber to an outside of the high-pressure plastic vessel, which is controlled by the valve, wherein a piston with a protruding stem is provided in a guide member, whereas between the guide member and the piston a chamber with a gas having a reference pressure smaller than a pressure of the gas in the high-pressure plastic vessel is enclosed, and the high pressure plastic vessel is closed by a closure with a central bore of smaller diameter than the diameter of the protruding stem, and a piston end remote from the protruding stem is pressurized by fluid in the fluid dispensing container, wherein the central bore of the closure is covered by an elastic disc which is fixed between the guide member and the closure.

* * * * *